June 22, 1965

C. A. JACK 3,190,633

COIL SPRING JOINT

Filed Aug. 5, 1963

INVENTOR.
CHARLES A. JACK

BY *Fulwider, Patton, Rieber, Lee & Utecht*

ATTORNEYS

United States Patent Office 3,190,633
Patented June 22, 1965

3,190,633
COIL SPRING JOINT
Charles A. Jack, 4972 Pine, La Mesa, Calif.
Filed Aug. 5, 1963, Ser. No. 299,853
4 Claims. (Cl. 267—1)

The present invention relates to a coupling for a coil spring, or a coupling for joining two coil springs with one another or for joining opposite ends of a coil spring to form an annulus.

In carrying out the invention, I provide an element in the form of the major part of a turn of a helix. This element is provided with confronting shoulders throughout the length thereof; these shoulders are arranged parallelly of the helix. In the preferred form this element is in the form of a tube.

The coupling, in addition to the aforesaid element, can include a base to which the element is fixed in any suitable manner, either mechanical or by soldering, brazing or welding. The end portion of the coil spring is threaded into helix-shaped element or tube, as the case may be.

If it is desirable to form an annulus of a coil spring, both of the opposite end portions of the spring are threaded into the element or tube. Too, if it is desirable to couple two coil springs, the adjacent end portions of the springs are threaded into the element or tube.

It may be desirable or necessary that the diameter of the coupling be the same as that of the coil spring. In that event the end portions of the spring or springs, to be received by the coupling, are of smaller diameter.

Further features and the advantages of the present invention will be apparent from the following description, reference being had to the accompanying drawing wherein preferred embodiments of the invention are illustrated.

Figure 2:
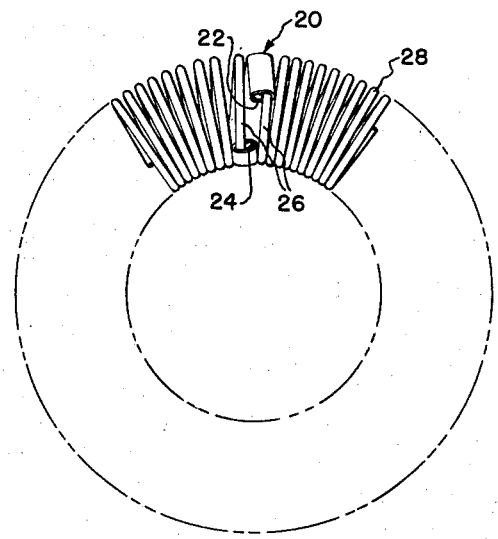
FIG. 2 is a view of an annulus formed of a coil spring, the end portions of the coil spring, forming the annulus, being shown as joined by the improved coupling.

Referring more in detail to the drawing, the coupling 20 is an element shaped in the form of the major part of a turn of a helix. It is provided with confronting shoulders 22 and 24, which are parallel of the helix. In the preferred embodiment this element is formed of tubing having a major cross-sectional diameter of slightly greater than twice the diameter of the wire of the coil, and having a minor cross-sectional diameter of slightly greater than the diameter of the wire of the coil.

Figure 3:
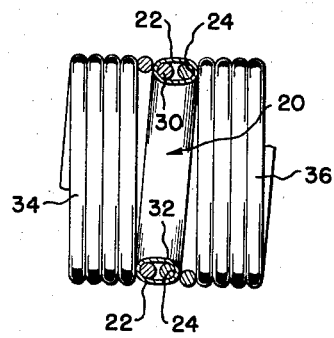
FIG. 3 is a view, partly in section, showing the coupling as one for joining adjacent end portions of springs.

As seen from FIG. 2, the end portions 26 of the spring 28, to be coupled to form the annulus, are both threaded into the coupling 20. Also, as seen in FIG. 3, the end portions 30 and 32 of springs 34 and 36, are both threaded into the coupling.

Figure 4:
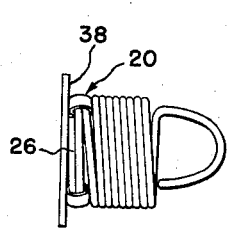
FIG. 4 is a view showing a spring coupled to the coupling, the latter being fixed to a base.
Figure 1:
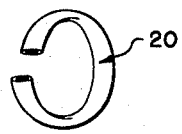
FIG. 1 is a perspective view of the coupling.

The coupling 20 can also be used for fastening a coil spring to another object. For example, quite often it is desirable to fix one end of a spring to an object. In that event, as shown in FIG. 4, the coupling can be soldered, brazed or welded to a metal base such as 38. Then the end portion 26 of the spring can be threaded into the coupling 20.

By back twisting the spring prior to inserting the end thereof into the coupling, and then threading the end portion of the spring into the couple, the tendency for the spring to untwist from its mooring is eliminated.

In certain instances it is desirable or necessary that the diameter of the spring and couple be maintained constant, as for example, if the annulus is used as a bearing. In those events, the end portions of the spring or springs are decreased in diameter as shown in FIG. 2.

Since springs are usually formed of tempered steel, they cannot be joined at the extreme end as by soldering, since such joint would be too weak. Nor can they be joined by brazing or welding, since the heat necessary for such joining destroys the temper of the steel. By employing the present coupling, the effect of welding can be attained without destroying the temper in the spring.

By virtue of the present invention, two turns of the coil spring only are necessary for joining the spring to a base. Also the tube need have only a narrow inside width, longitudinally of the axis of the spring, for coupling the opposite ends of a coil spring or coupling two coil springs. It need have a width only slightly in excess of twice the diameter of the wire of the spring.

The finish of the coupling can be the same color as the spring. Thus a neat and finished appearance is attained.

Too, the coupling can be employed on compression as well as tension types of springs. Also by selecting the proper material for the coupling, it can withstand tension at least equal to the maximum duty to be performed by the spring.

Many uses can be made of the present invention. As an example, such spring can be employed as shown in my copending application, Serial No. 267,451, filed March 25, 1963. By employing the present coupling, nearly the entire circumference of the spring can be used for holding disc-type records in place.

While the forms of embodiment herein shown and described, constitute preferred forms, it is to be understood that other forms may be adopted falling within the scope of the claims that follow.

In the claims:
1. A combination comprising:
   (A) a base;
   (B) a coupling comprising an element confined to the major part of a single turn of a helix and having confronting shoulders throughout the length thereof, said shoulders being arranged parallelly of the helix, said coupling being fixed to the base, the diameter of said element longitudinally of the axis of the helix being confined to approximately twice the inside minor diameter of the element transversely of the axis of the helix;
   (C) and a coil spring having an end portion threaded into abutting relationship with said shoulders, the diameters of said end portion of the spring, which is received by the element, being less than the diameter of the adjacent part of the spring, and the outside diameter of the element is substantially the same as the diameter of said adjacent part of the coil of the spring.

2. A combination comprising:
   (A) coiled spring structure having:
      (1) a coiled end portion,
      (2) a second coiled end portion,
   (B) an element confined to the major part of a single turn of a helix and having confronting shoulders throughout the length thereof, said shoulders being arranged parallelly of the helix, said end portions being threaded into said element, the diameter of said element longitudinally of the axis of the helix being confined to approximately twice the inside minor diameter of the element transversely of the axis of the helix, and the material forming the coil springs having a diameter approximating the minor inside diameter of the element, the outer diameter of the coiled end portions of the spring structure, which are received by the element, being less than the adjacent parts of the spring structure, and the outside diameter of the element being substantially the same as the diameter of said adjacent parts of the spring structure.

3. A combination comprising:
(A) coiled spring structure having:
  (1) a coiled end portion,
  (2) a second coiled end portion,
(B) a tube confined to the major part of a single turn of a helix, said end portions being threaded into said tube, the diameter of said tube longitudinally of the axis of the helix being confined to approximately twice the inside minor diameter of the tube transversely of the axis of the helix, and the material forming the coil spring structure having a diameter approximating the minor inside diameter of the tube, the outer diameter of the end portions of the spring means, which are received by the tube, being less than the adjacent parts of the spring structure, and the outside diameter of the tube being substantially the same as the diameter of said adjacent parts of the spring structure.

4. A combination comprising:
(A) a helical coil spring structure having:
  (1) a coil end portion, and
  (2) a second coil end portion;
(B) a tube confined to substantially the full major part of a single turn of the helix, the tube in cross section having a major diameter and a minor diameter, said end portions being threaded into said tube, the major inside diameter of said tube being disposed longitudinally of the axis of the helix and being confined to approximately twice the inside minor diameter, and the minor inside diameter of the tube being confined to approximately the diameter of the material forming the end portions and lying transversely of the axis of the helix.

References Cited by the Examiner

UNITED STATES PATENTS

| | | |
|---|---|---|
| 1,451,936 | 4/23 | Young. |
| 2,168,148 | 8/39 | Arehart. |
| 2,344,858 | 3/44 | Farmer. |
| 3,073,565 | 1/63 | Daumy _____ 267—1 X |

FOREIGN PATENTS 1,006,768  1/52  France.

ARTHUR L. LA POINT, *Primary Examiner.*